United States Patent
Onoda

(10) Patent No.: US 11,099,701 B2
(45) Date of Patent: Aug. 24, 2021

(54) INFORMATION PROCESSING SYSTEM, POSITION INDICATOR, AND METHOD OF CONTROLLING MOVEMENT OF DISPLAY OBJECT ON DISPLAY SCREEN OF INFORMATION PROCESSING APPARATUS

(71) Applicant: Wacom Co., Ltd., Kazo (JP)

(72) Inventor: Naoto Onoda, Saitama (JP)

(73) Assignee: Wacom Co., Ltd., Kazo (JP)

( * ) Notice: Subject to any disclaimer, the term of this patent is extended or adjusted under 35 U.S.C. 154(b) by 0 days.

(21) Appl. No.: 16/799,554

(22) Filed: Feb. 24, 2020

(65) Prior Publication Data

US 2020/0301548 A1    Sep. 24, 2020

(30) Foreign Application Priority Data

Mar. 19, 2019 (JP) .............................. JP2019-050536

(51) Int. Cl.
| | | |
|---|---|---|
| *G06F 3/044* | (2006.01) | |
| *G06F 3/0354* | (2013.01) | |
| *G06F 3/0484* | (2013.01) | |
| *G06F 3/0485* | (2013.01) | |
| *H04W 4/80* | (2018.01) | |

(52) U.S. Cl.
CPC ........ *G06F 3/0448* (2019.05); *G06F 3/03546* (2013.01); *G06F 3/04842* (2013.01); *G06F 3/04855* (2013.01); *H04W 4/80* (2018.02); *G06F 2203/04106* (2013.01)

(58) Field of Classification Search
CPC combination set(s) only.
See application file for complete search history.

(56) References Cited

U.S. PATENT DOCUMENTS

2011/0128258 A1 *  6/2011  Liang .................. G06F 3/03545
                                                    345/180

FOREIGN PATENT DOCUMENTS

JP          2004206613 A     7/2004

* cited by examiner

*Primary Examiner* — Deeprose Subedi
(74) *Attorney, Agent, or Firm* — Christensen O'Connor Johnson Kindness PLLC

(57) ABSTRACT

An information processing system includes: an information processing apparatus; and a position indicator configured to input position information to the information processing apparatus. The position indicator includes: a first sensor configured to detect a movement amount of a fingertip of a user, a second sensor configured to detect a tilt of the position indicator, and a transmission section configured to transmit data indicative of the movement amount detected by the first sensor and of the tilt detected by the second sensor. The information processing apparatus includes: a reception section configured to receive the data transmitted from the position indicator, and a first processor configured to control a movement of a display object displayed on a display screen on the basis of the tilt and the movement amount indicated by the data received by the reception section.

18 Claims, 13 Drawing Sheets

INFORMATION PROCESSING SYSTEM, POSITION INDICATOR, AND METHOD OF CONTROLLING MOVEMENT OF DISPLAY OBJECT ON DISPLAY SCREEN OF INFORMATION PROCESSING APPARATUS

CROSS REFERENCE TO RELATED APPLICATION

This application claims priority under 35 U.S.C. § 119 to Japanese Patent Application No. 2019-050536, filed Mar. 19, 2019, which is herein incorporated by reference in its entirety.

BACKGROUND

1. Field

The present disclosure relates to an information processing system, a position indicator, and a method of controlling the movement of a display object on a display screen of an information processing apparatus.

2. Description of the Related Art

For an electronic device configured to permit input through its display screen by use of a position indicator such as an electronic pen, there exists technology for providing a groove-like input section on the right and bottom sides of the screen to facilitate the scroll of screen display (for example, see Japanese Patent Laid-open No. 2004-206613 (hereinafter, referred to as Patent Document 1)).

However, the above-mentioned technology requires that a special hardware feature made of grooves be provided on the electronic device. There has been a need for easily controlling the movement of a display object on a display screen by use of a position indicator without requiring the electronic device to be equipped with the special hardware feature.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

It is therefore an object of the present disclosure to provide an information processing system, a position indicator, and a method of controlling the movement of a display object on a display screen of an information processing apparatus using the position indicator, the display object being controlled easily for movement on the display screen.

According to the present disclosure, there is provided an information processing system including: an information processing apparatus; and a position indicator configured to input position information to the information processing apparatus. The position indicator includes: a first sensor configured to detect a movement amount of a fingertip of a user, a second sensor configured to detect a tilt of the position indicator, and a transmission section configured to transmit data indicative of the movement amount detected by the first sensor and of the tilt detected by the second sensor. The information processing apparatus includes: a reception section configured to receive the data transmitted from the position indicator, and a first processor configured to control a movement of a display object displayed on a display screen on the basis of the tilt and the movement amount indicated by the data received by the reception section.

Also according to the present disclosure, there is provide a position indicator for inputting position information to an information processing apparatus. The position indicator includes: a first sensor configured to detect a movement amount of a fingertip of a user; a second sensor configured to detect a tilt of the position indicator; and a transmission section configured to transmit data indicative of the movement amount detected by the first sensor and of the tilt detected by the second sensor.

Also according to the present disclosure, there is provided a method for use with an information processing system including an information processing apparatus and a position indicator configured to input position information to the information processing apparatus, the method being devised to control a movement of a display object displayed on a display screen of the information processing apparatus. The method includes: causing the position indicator to detect a movement amount of a fingertip of a user; causing the position indicator to detect a tilt of the position indicator; causing the position indicator to transmit data indicative of the detected movement amount and of the detected tilt; causing the information processing apparatus to receive the data transmitted from the position indicator; and causing the information processing apparatus to control the movement of the display object displayed on the display screen on the basis of the tilt and the movement amount indicated by the received data.

The present disclosure thus provides an information processing system and a position indicator for easily controlling the movement of a display object on a display screen by use of the position indicator, as well as a method of controlling the movement of a display object on a display screen of an information processing apparatus.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Some embodiments of the present disclosure are described below in detail with reference to the accompanying drawings.

Figure 1:
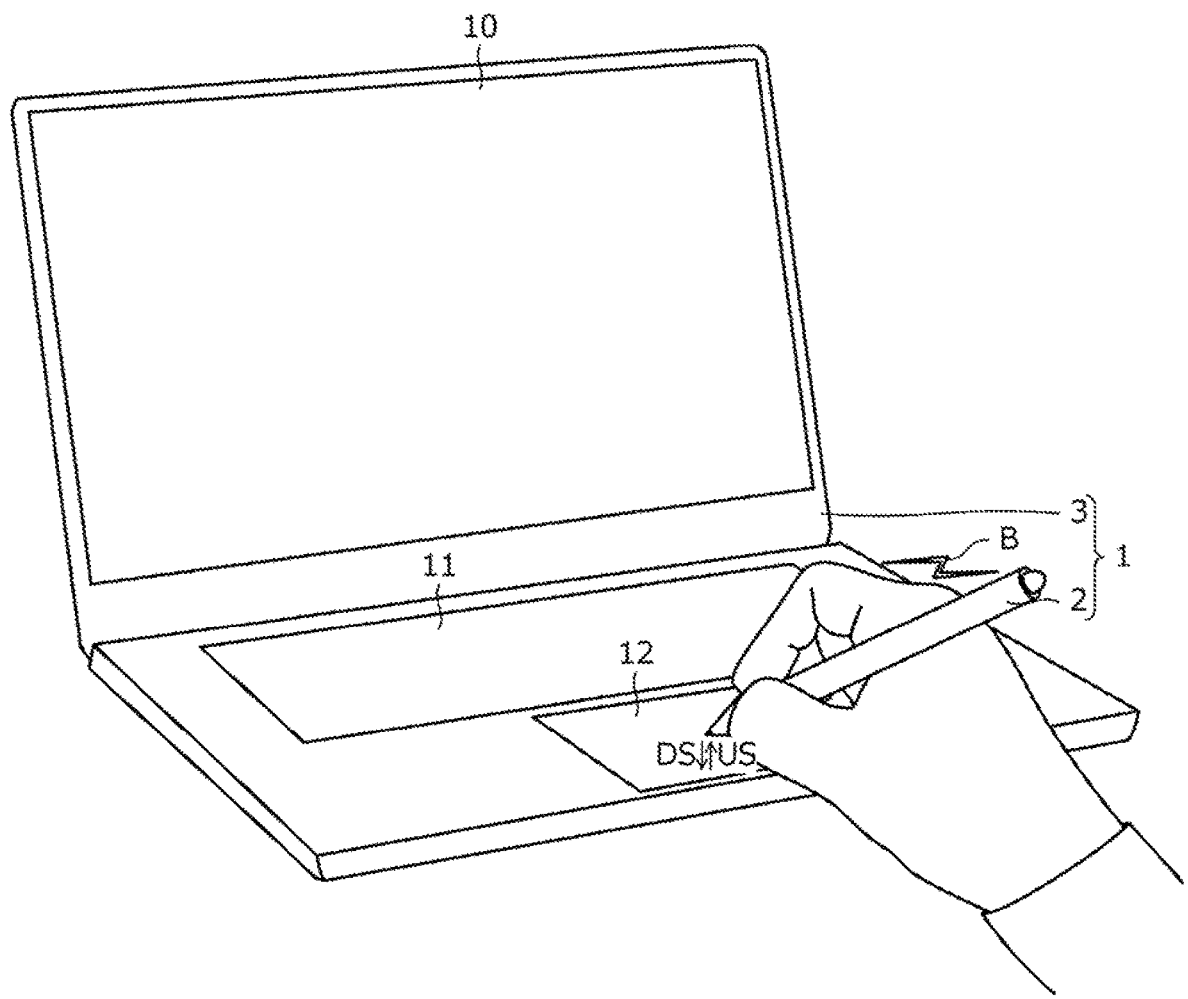
FIG. 1 is a view depicting the use state of an information processing system according to a first embodiment of the present disclosure.

FIG. 1 is a view depicting the use state of an information processing system 1 according to a first embodiment of the present disclosure. As illustrated in FIG. 1, the information processing system 1 includes an electronic pen 2 and a computer 3.

The electronic pen 2 is a position indicator for inputting position information to the computer 3. The electronic pen 2 is used by a user to point a position on a touch surface of a touch pad 12. The position pointed by the electronic pen 2 constitutes input to the computer 3.

The computer 3 is typically an information processing apparatus of the laptop computer type. Alternatively, the computer 3 may be an information processing apparatus of some other type such as a tablet, a desktop personal computer, or a server computer.

As depicted in FIG. 1, the computer 3 includes a display 10, a keyboard 11, and the touch pad 12. The display 10, which is a display apparatus having a display screen such as a liquid crystal display or an organic electroluminescence (EL) display, plays the role of visually outputting characters and graphics. The keyboard 11 and the touch pad 12 are input apparatuses used by the user to perform input to the computer 3.

The touch pad 12 is configured to detect the position where a fingertip or a tip of the electronic pen 2 is located on the touch surface. The fingertip is detected by the capacitance method, whereas the tip of the electronic pen 2 is detected by the active capacitive coupling method. In this case, the electronic pen 2 is configured to transmit and receive signals to and from the touch pad 12 via an electrode (pen tip electrode 23, to be explained later, depicted in FIG. 2) provided at the tip of the pen. Of these signals thus exchanged, the signal transmitted from the touch pad 12 to the electronic pen 2 will be referred to as an uplink signal US, and the signal transmitted from the electronic pen 2 to the touch pad 12 as a downlink signal DS hereunder. The reaching distance of the uplink signal US is approximately 10 centimeters (cm) and that of the downlink signal DS is approximately a few cm.

The position of the fingertip or the tip of the electronic pen 2 may be detected by some other method. For example, the position not only of the fingertip but also of the tip of the electronic pen 2 may be detected by the capacitance method. The position of the electronic pen 2 may be detected by the electromagnetic induction method. The touch pad 12 may adopt, for example, the pressure sensing method for detecting the position of the fingertip or the tip of the electronic pen 2. Furthermore, some other device such as the display 10 may be configured to detect the position of the fingertip or the tip of the electronic pen 2 in addition to, or in place of, the touch pad 12.

The touch pad 12 also has a function of detecting a click operation. Specifically, the click operation is detected by a pressure sensor, not depicted, that senses a tap operation on the touch surface (as a pressure pad). Alternatively, a push-button switch may be arranged under the touch surface. When pressed by the user, the touch surface is displaced downward to press the push-button switch, allowing the click operation to be detected (as a click pad). As another alternative, a separate click button may be provided near the touch surface. The click button is then pressed to let the click operation be detected.

Besides communicating via the above-mentioned pen tip electrode 23, the electronic pen 2 and the computer 3 are configured to communicate with each other by near field communication B such as Bluetooth (registered trademark). The reaching distance of the near field communication B is approximately 10 meters (m), far longer than that of the above-mentioned uplink signal US or downlink signal DS.

Figure 2:
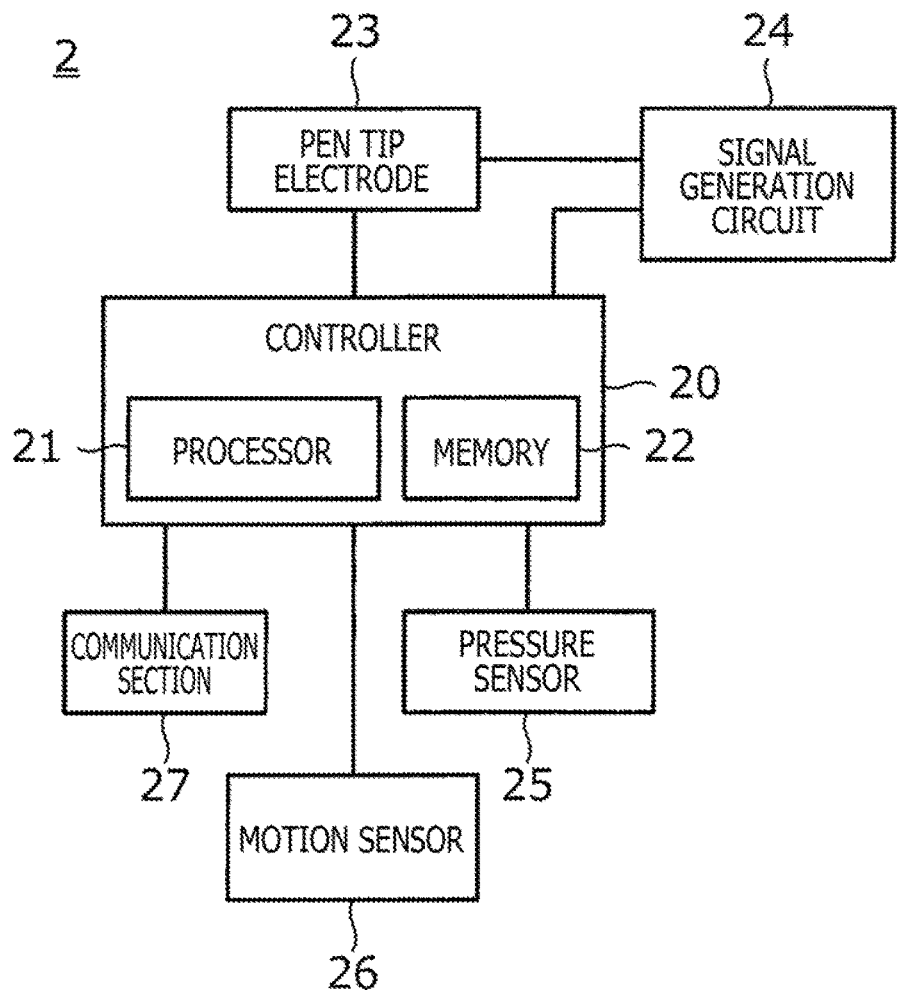
FIG. 2 is a view depicting the system configuration of an electronic pen according to the first embodiment of the disclosure.

FIG. 2 is a view depicting the system configuration of the electronic pen 2. As illustrated in FIG. 2, the electronic pen 2 includes a controller 20, the pen tip electrode 23, a signal generation circuit 24, a pressure sensor 25, a motion sensor 26, and a communication section 27. The controller 20 incorporates a processor 21 and a memory 22.

The controller 20 is a functional section that operates with the processor 21 reading and executing preinstalled programs in the memory 22. The controller 20 plays the role of controlling the components in the electronic pen 2. What is controlled includes a process of receiving the uplink signal US via the pen tip electrode 23, a process of supplying the downlink signal DS to the signal generation circuit 24, a process of performing the near field communication B with the computer 3 by way of the communication section 27, and a process of acquiring physical quantities detected by the pressure sensor 25 and motion sensor 26.

Figure 3:
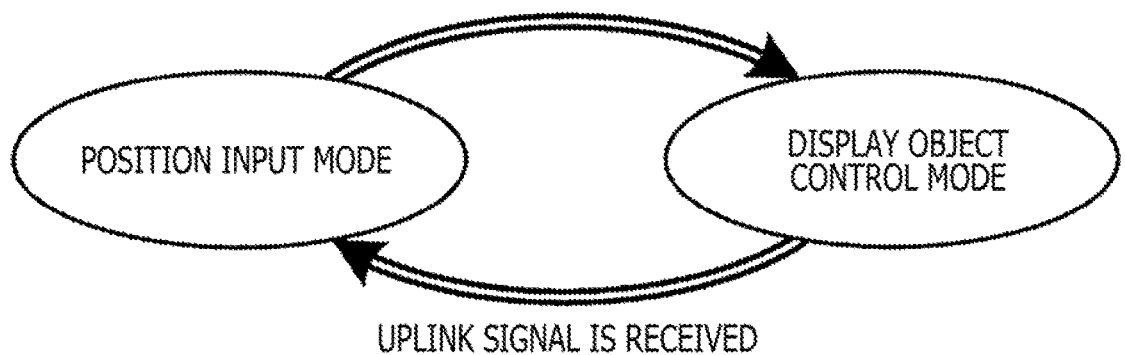
FIG. 3 is a view depicting operation mode transitions of a controller according to the first embodiment of the disclosure.

FIG. 3 is a view depicting operation mode transitions of the controller 20. As illustrated in FIG. 3, the operation modes of the controller 20 include a position input mode and a display object control mode. The position input mode is a mode in which the uplink signal US and the downlink signal DS are transmitted and received to and from the touch pad 12 to let the computer 3 detect the pen position on the touch surface (a first mode in which the electronic pen 2 inputs position information to the computer 3). In a case where the uplink signal US is received from the computer 3 (i.e., where the electronic pen 2 is close enough to the touch pad 12 to receive the uplink signal US therefrom), the controller 20 enters the position input mode. On the other hand, the display object control mode is a mode in which a display object (specifically a knob 42c or 43c in FIG. 6, to be discussed later) is displayed on the display 10 in FIG. 1 is moved by the user operating the electronic pen 2 (a second mode in which the electronic pen 2 controls the computer 3). In a case where the uplink signal US is not received from the computer 3 (i.e., where the electronic pen 2 is not close enough to the touch pad 12 to receive the uplink signal US therefrom), the controller 20 enters the display object control mode.

Returning to FIG. 2, the pen tip electrode 23 is a conductor provided at the tip of the electronic pen 2. The pen tip electrode 23 is connected with the controller 20 and with the signal generation circuit 24. When the pen tip electrode 23 enters a capacitive field generated by a touch sensor 13, to be discussed later, in response to the uplink signal US, electric charges corresponding to the uplink signal US are induced in the pen tip electrode 23. The controller 20 receives the uplink signal US by demodulating the electric charges thus induced. Further, when the downlink signal DS is supplied to the pen tip electrode 23 from the signal generation circuit 24, the pen tip electrode 23 generates a capacitive field in response to the downlink signal DS. The computer 3 acquires the downlink signal DS from this capacitive field, as will be discussed later in detail.

The signal generation circuit 24 is a circuit that modulates a predetermined carrier signal based on the downlink signal DS supplied form the controller 20, before sending the modulated carrier signal to the pen tip electrode 23.

The communication section 27 is a functional section that acts as an interface for use in the near field communication B. Initially, the communication section 27 establishes pairing with the computer 3. Thereafter, the communication section 27 transmits and receives signals by the near field communication B under control of the controller 20. The communication section 27 plays the role of a transmission section that transmits data indicative of a movement amount of the user's fingertip detected by the pressure sensor 25 and a tilt detected by the motion sensor 26, as will be discussed later in detail.

The pressure sensor 25 is configured to detect pressure. In the first embodiment, the pressure sensor 25 plays the role of detecting the movement amount of the user's fingertip on the surface of the electronic pen 2. Alternatively, a capacitive sensor may be used in place of, or in combination with, the pressure sensor 25. The motion sensor 26 is configured to detect acceleration, tilt, and direction of an object. In this embodiment, the motion sensor 26 plays the role of detecting the tilt of the electronic pen 2. Preferably, the motion sensor 26 may be a six-axis sensor, for example.

Figure 4A:
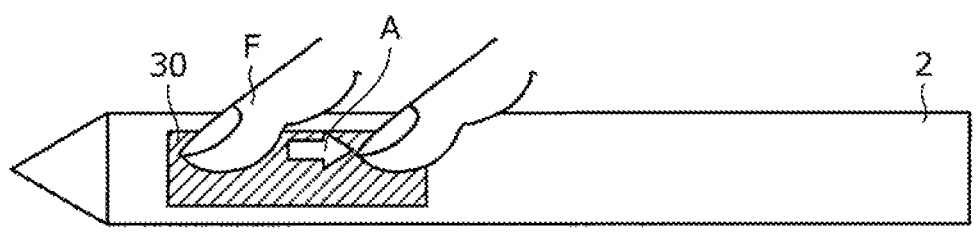
FIG. 4A is a schematic side view of the electronic pen according to the first embodiment of the disclosure.
Figure 4B:
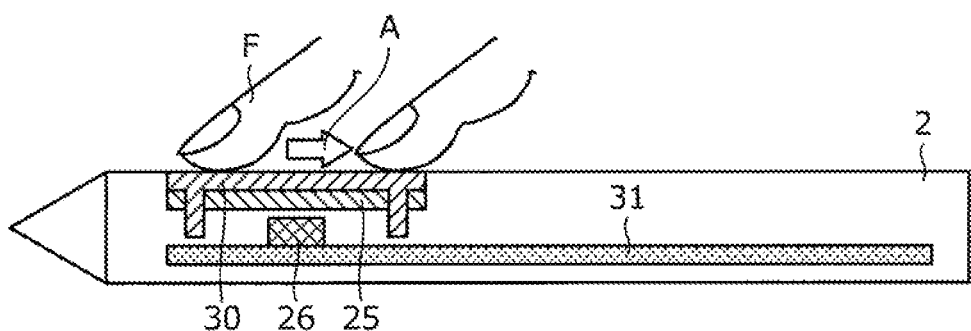
FIG. 4B is a schematic cross-sectional view of the electronic pen according to the first embodiment of the disclosure.

FIG. 4A is a schematic side view of the electronic pen 2, and FIG. 4B is a schematic cross-sectional view of the electronic pen 2. As illustrated in these drawings, a pressure sensing type side switch 30 is exposed on a side surface of the electronic pen 2. The pressure sensor 25 is arranged in parallel with an inner surface of the side switch 30. When the user moves his or her fingertip in a depicted direction A while applying pressure of at least a predetermined value to the side switch 30, the pressure sensor 25 detects the amount of the fingertip movement. The motion sensor 26, which is fixed to a surface of a substrate 31 secured inside the electronic pen 2, plays the role of detecting the tilt of the electronic pen 2 as described above.

Figure 5A:
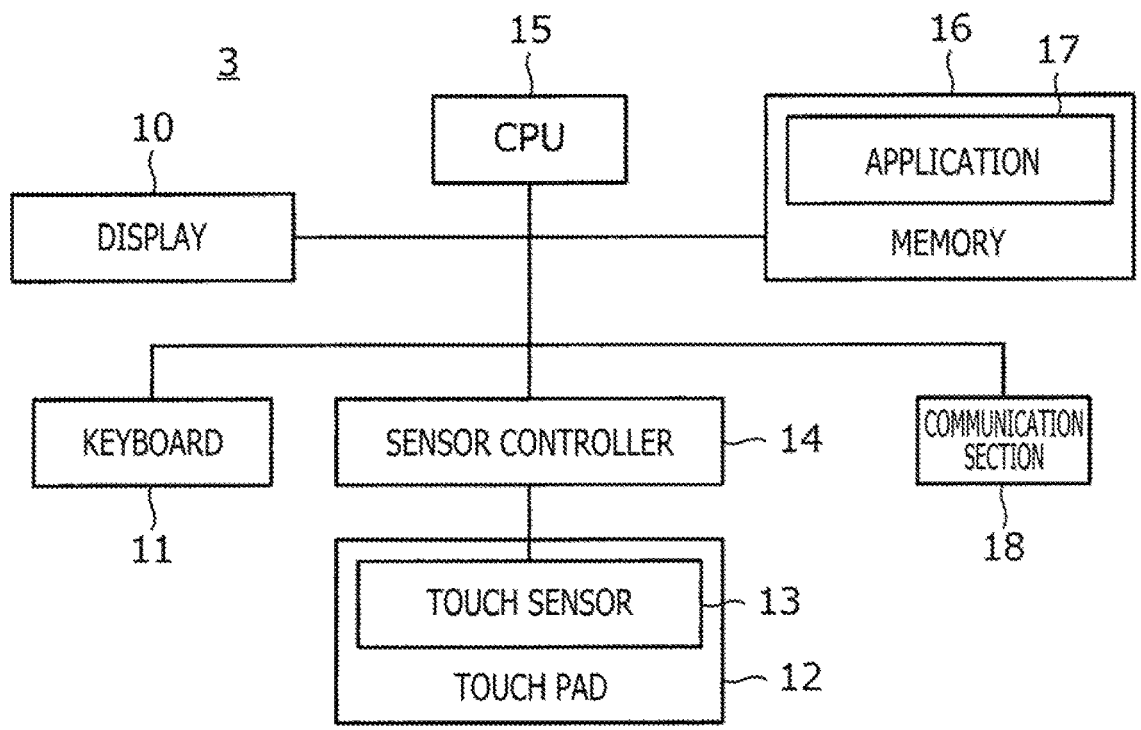
FIG. 5A is a view depicting the system configuration of a computer according to the first embodiment of the disclosure.

FIG. 5A is a view depicting the system configuration of the computer 3. As depicted in FIG. 5A, the computer 3 includes a sensor controller 14, a CPU 15, a memory 16, and a communication section 18 in addition to the display 10, the keyboard 11, and the touch pad 12 that are also depicted in FIG. 1. The touch pad 12 incorporates a touch sensor 13. The memory 16 stores an application program 17 (i.e., its object code).

Although not depicted, the touch sensor 13 is configured with multiple linear electrodes equally spaced and extending in an x direction (called the X electrodes hereunder) and multiple linear electrodes equally spaced and extending in a y direction (called the Y electrodes hereunder), the linear electrodes being superposed one on top of the other. Alternatively, the touch sensor 13 may be configured with multiple insular electrodes arranged in a matrix pattern. In a case where a device other than the touch pad 12, such as the display 10, is to detect the position of the fingertip or the tip of the electronic pen 2, the touch sensor 13 is provided on that device, as will be discussed later with reference to FIG. 5B.

The sensor controller 14 is a functional section that detects a position on the touch surface pointed by the fingertip or by the tip of the electronic pen 2 via the touch sensor 13. What follows is a detailed description of the operation of the sensor controller 14 in an example where detection of the fingertip by the capacitance method and detection of the tip of the electronic pen 2 by the active capacitive coupling method are achieved on a time-sharing basis.

Where the fingertip is to be detected, the sensor controller 14 supplies each of the multiple X electrodes in the touch sensor 13 with a fingertip detection signal constituted by as many pulses as the number of the X electrodes, the signal being received by each of the Y electrodes in the touch sensor 13. The sensor controller 14 is configured to calculate a correlation between the signal received by each Y electrode on one hand and the fingertip detection signal supplied to each X electrode on the other hand, before deriving the position of the fingertip based on the calculated correlation. The amplitude of the fingertip detection signal received by a given Y electrode reflects the capacitance at an intersection point between that Y electrode and each X electrode. The nearer the fingertip, the smaller the capacitance at each intersection point. This enables the sensor controller 14 to derive the fingertip position from the above process.

Meanwhile, with regard to detecting the tip of the electronic pen 2, the sensor controller 14 is configured to operate either in discovery mode or in communication mode. The discovery mode is a mode that the sensor controller 14 enters when the tip of the electronic pen 2 has yet to be detected. In the discovery mode, the sensor controller 14 causes each of the multiple X electrodes or Y electrodes to transmit periodically the uplink signal US to scan the X and Y electrodes sequentially in the touch sensor 13. The sensor controller 14 then waits for reception of the downlink signal DS transmitted from the electronic pen 2 that has received the uplink signal US. Upon receipt of the downlink signal DS, the sensor controller 14 derives the position of the electronic pen 2 based on the reception intensity at each X electrode and at each Y electrode (global scan). The sensor controller 14 detects the tip of the electronic pen 2 by deriving its position in this manner, before entering the communication mode for communication with the detected electronic pen 2. In the communication mode, the sensor controller 14 scans only those linear electrodes positioned close to the most-recently derived position, thereby updating the position of the electronic pen 2 (local scan).

The downlink signal DS transmitted by the electronic pen 2 includes a burst signal and a data signal, the burst signal (e.g., an unmodulated signal of a single frequency) being used by the sensor controller 14 to detect the position of the tip of the electronic pen 2 in the above-described manner, the data signal being modulated with various data held in the electronic pen 2. Transmission of the data by the data signal is ordered by the sensor controller 14 transmitting the uplink signal US including a command. For example, the data includes a writing pressure value indicative of the writing pressure applied to the tip of the electronic pen 2; information indicative of an on/off state of the switch provided on the surface of the electronic pen 2; and a pen identification (ID) for identifying the electronic pen 2. Upon receipt of the data signal, the sensor controller 14 decodes the received data signal so as to obtain the data transmitted from the electronic pen 2.

While in the communication mode, the sensor controller 14 performs the following tasks intermittently: issuing orders to the electronic pen 2 by transmitting the uplink signal US thereto, detecting the position of the tip of the electronic pen 2 upon receipt of the downlink signal DS, and receiving data transmitted from the electronic pen 2. When the downlink signal DS is not received for a predetermined time period typically because the electronic pen 2 is away from the touch sensor 13, the sensor controller 14 cancels the communication mode and returns to the discovery mode.

Figure 5B:
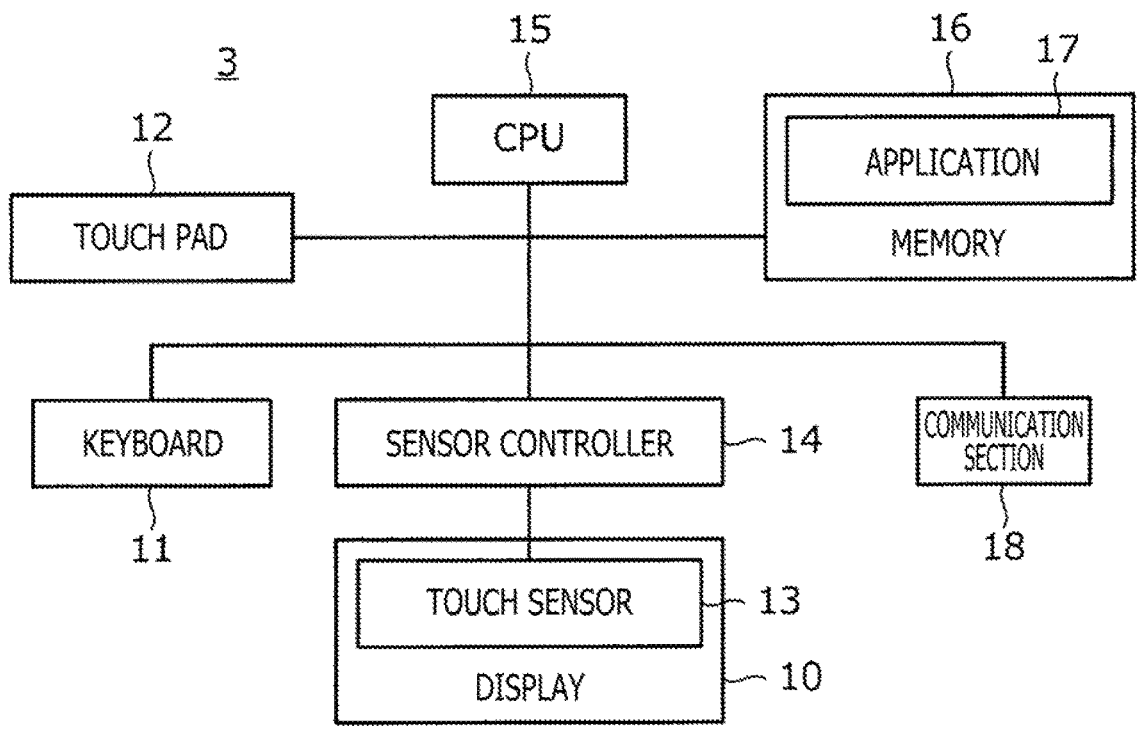
FIG. 5B is a view depicting the system configuration of a computer according to a modification of the first embodiment of the disclosure.

FIG. 5B is a view depicting the system configuration of the computer 3 according to a modification of the first embodiment of the disclosure. The computer 3 of this modification may be configured as illustrated in FIG. 5B. The difference from the configuration in FIG. 5A is that the touch sensor 13 is provided not in the touch pad but inside the display 10. The function of the touch sensor 13 is similar to that in FIG. 5A. Part or all of the electrodes for detecting the fingertip and the tip of the electronic pen 2 (e.g., above-mentioned X and Y electrodes) may be shared with the electrodes for driving the pixels in the display 10 (e.g., a common electrode for a liquid crystal display, or negative electrodes for an organic EL display). In this case, however, the fingertip or the tip of the electronic pen 2 is not detected while the pixels are being driven. The sensor controller 14 needs to detect the fingertip and the tip of the electronic pen 2 while the pixels are not driven.

Returning to FIG. 5A, the CPU 15 is a functional section that operates by reading and executing a preinstalled program in the memory 16 (e.g., application program 17 in the drawing). The CPU 15 plays the role of controlling the components in the computer 3. What is controlled includes: a process of causing the display 10 to display an image of a graphical user interface that includes a cursor and various windows; a process of consecutively obtaining the positions of the fingertip and the tip of the electronic pen 2 detected by the sensor controller 14 as well as the data received by the sensor controller 14 from the electronic pen 2; a process, based on the obtained data, of moving the cursor, generating digital ink, and performing rendering on the display 10; a process of accepting input from various input sections such as the keyboard 11, touch pad 12, and a mouse; a process of performing the near field communication B with the electronic pen 2 via the communication section 27; and a process of controlling the movement of a display object displayed on the display 10 on the basis of the data received from the electronic pen 2 and indicative of the movement amount and tilt thereof.

The memory 16 is a storage apparatus that includes a main storage unit such as a dynamic random access memory (DRAM) and an auxiliary storage unit such as a hard disk.

The communication section 18 is a functional section that provides an interface for use in the near field communication B. The communication section 18 initially establishes pairing with the electronic pen 2. Thereafter, under control of the CPU 15, the communication section 18 transmits and receives signals by the near field communication B. The communication section 18 plays the role of a reception section that receives from the electronic pen 2 the above-mentioned data indicative of the movement amount and tilt, as will be discussed later in detail.

The application program 17 runs on operating system software, not depicted. The CPU 15 is configured to activate the application program 17 in response to operations performed by the user on the touch pad 12, for example. The application program 17 thus activated performs diverse processes including a process of displaying windows, to be discussed later, in accordance with the internal code.

Figure 6:
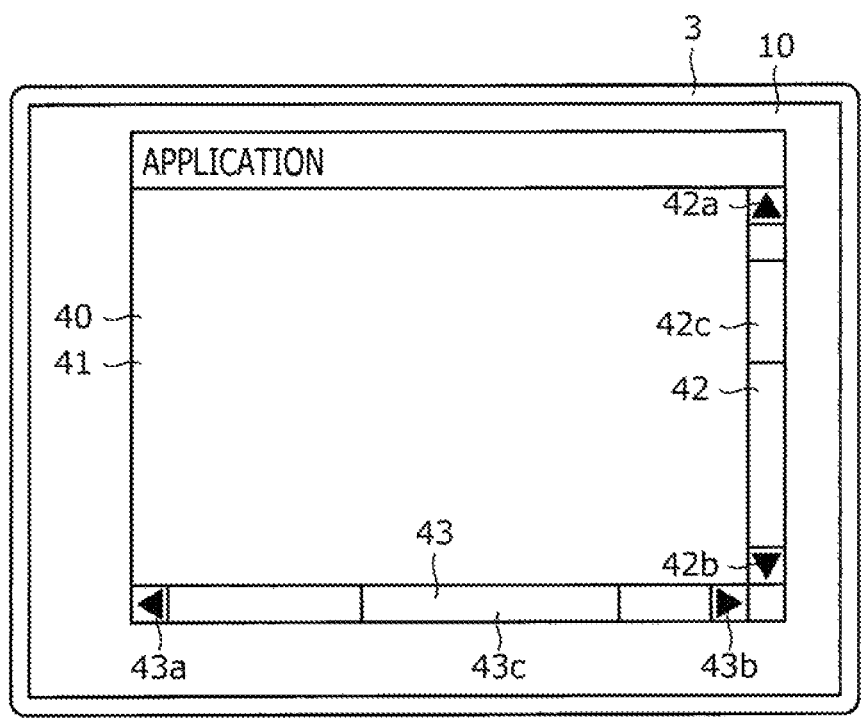
FIG. 6 is a view depicting an example of a window displayed by an application program according to the first embodiment of the disclosure.

FIG. 6 is a view depicting an example of a window 40 displayed by the application program 17. As illustrated, the window 40 includes a rectangular display region 41, a vertical scroll bar 42 arranged along the right side of the display region 41, and a horizontal scroll bar 43 arranged along the lower side of the display region 41. The vertical scroll bar 42 includes an upper arrow 42a, a lower arrow 42b, and a knob 42c. Likewise, the horizontal scroll bar 43 includes a left-side arrow 43a, a right-side arrow 43b, and a knob 43c.

In a case where the data to be displayed in the display region 41 has an area larger than that of the display region 41, the sizes and positions of the knobs in the vertical scroll bar 42 and in the horizontal scroll bar 43 indicate the position of the currently displayed portion of the entire display data. Also, the knobs or the arrows in the scroll bars play the role of accepting operations to change the currently displayed portion. The vertical scroll bar 42 is used to change the currently displayed portion in the vertical direction. This type of vertical change will be referred to as "vertical scroll" hereunder. The horizontal scroll bar 43 is used to change the currently displayed portion in the horizontal direction. This type of horizontal change will be referred to as "horizontal scroll" hereunder.

In a case where the vertical scroll or the horizontal scroll is to be executed with the keyboard 11, for example, the user can easily make the vertical or horizontal scroll using the cursor keys (not depicted) included in the keyboard 11. In this case, there is no need for the user to directly operate the vertical scroll bar 42 or the horizontal scroll bar 43. The application program 17 carries out the vertical scroll and horizontal scroll in keeping with the amount of operation on the cursor keys while updating the display of the knobs 42c and 43c at the same time.

In a case where the vertical or horizontal scroll is to be performed with a mouse, not depicted, the user moves the cursor onto the position of a knob or an arrow displayed on the display 10 and clicks on a mouse button as needed. This allows the user to make the vertical or horizontal scroll with ease.

By contrast, it is possible, but difficult, to make the vertical or horizontal scroll by operating the electronic pen 2 on the touch pad 12. In this case, as in the case where the mouse is used, the vertical or horizontal scroll can be performed by moving the cursor onto the position of a knob or an arrow appearing on the display 10 and by clicking on the touch pad 12. However, the electronic pen 2 is not suitable for minute operations such as moving the cursor onto the position of a knob or an arrow. It is more difficult still to click on the touch pad 12 while carrying out those minute operations. The technology described in the above-cited Patent Document 1 is aimed at overcoming such difficulty by resorting to the groove-like input section provided on the right side and the lower side of the screen. However, because of the need to provide the special hardware feature constituted by grooves, this technology may not be applicable to all computers 3. The present disclosure, by contrast, involves having the electronic pen 2 and the computer 3 configured in such a manner that the display object displayed on the display 10 is moved by physical quantities detected by the pressure sensor 25 and by the motion sensor 26 depicted in FIG. 2. Movement of the display object (specifically, knob 42c or 43c) on the display 10 is thus controlled easily using the electronic pen 2 without recourse to the special hardware feature such as the groove-like input section described in the above-cited Patent Document 1. This point will be explained below in detail with reference to the flowcharts of processes performed by the electronic pen 2 and the computer 3.

Figure 7:
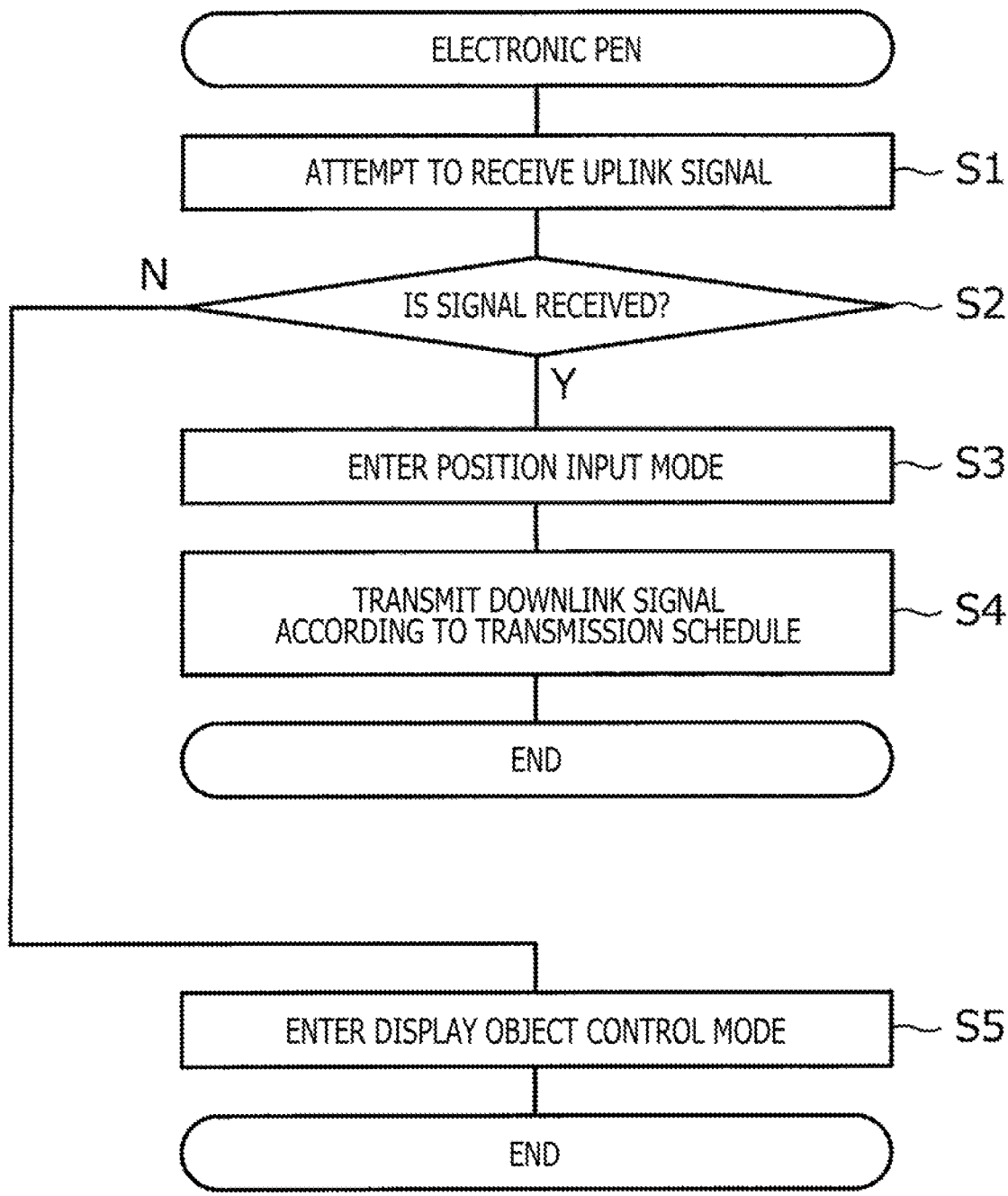
FIG. 7 is a flowchart depicting a process performed by the controller of the electronic pen according to the first embodiment of the disclosure.
Figure 8:
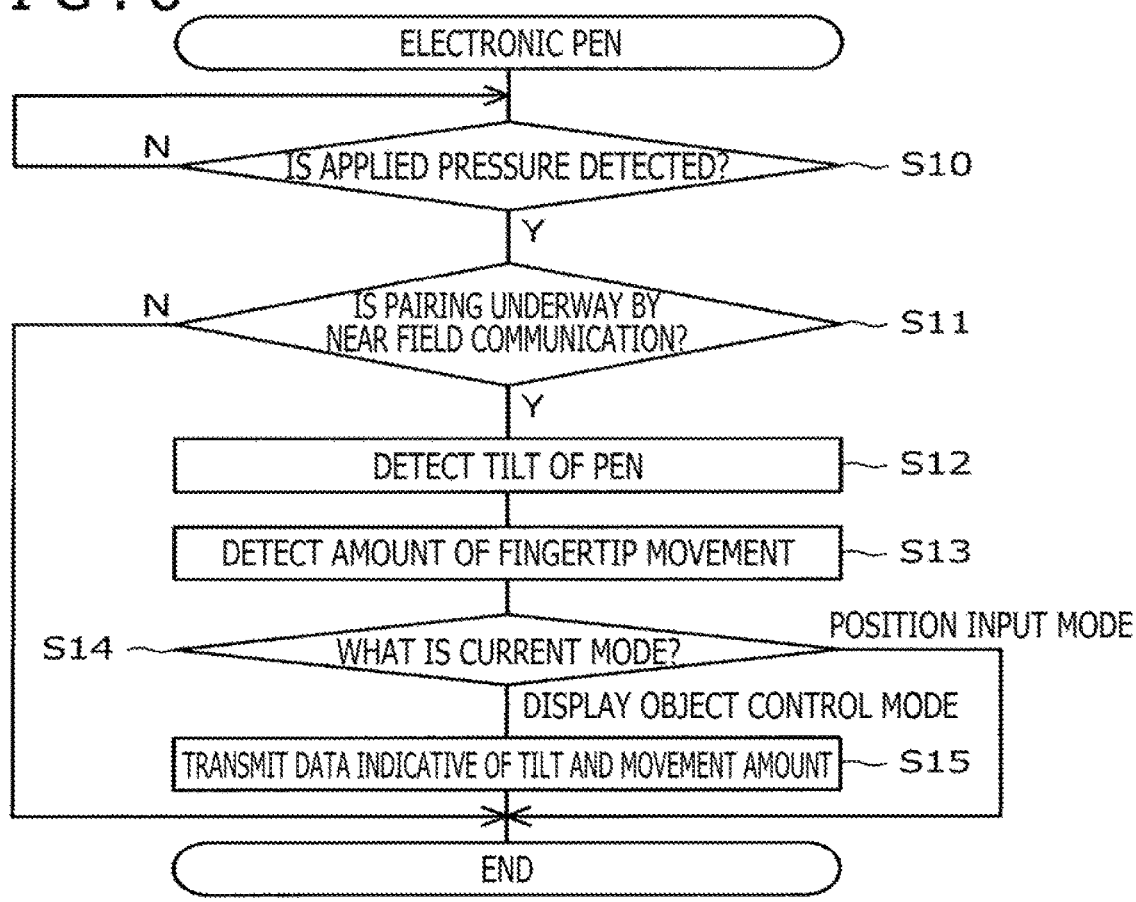
FIG. 8 is a flowchart depicting another process performed by the controller of the electronic pen according to the first embodiment of the disclosure.

FIGS. 7 and 8 are flowcharts of processes performed by the controller 20 of the electronic pen 2. FIG. 7 depicts a process of switching between the position input mode and the display object control mode illustrated in FIG. 3. As depicted in FIG. 7, the electronic pen 2 first attempts to receive the uplink signal US (step S1). Until detecting the computer 3, the electronic pen 2 repeats this attempt in a cycle sufficiently shorter than the cycle in which the computer 3 transmits the uplink signal US. After detecting the computer 3, the electronic pen 2 attempts to receive the uplink signal US at a timing ordered by the computer 3 via the uplink signal US, for example.

Following the attempt to receive the uplink signal US, the electronic pen 2 determines whether or not the uplink signal US is received (step S2). If the uplink signal US is determined to be received, the electronic pen 2 enters the position input mode (step S3). The electronic pen 2 then transmits the downlink signal DS in accordance with a transmission schedule indicated by the received uplink signal US (step S4).

On the other hand, if it is determined in step S2 that the uplink signal US is not received, the electronic pen 2 enters the display object control mode (step S5). The electronic pen 2 then terminates the process without transmitting the downlink signal DS.

FIG. 8 depicts a process of transmitting the physical quantities detected by the pressure sensor 25 and by the motion sensor 26. As depicted in FIG. 8, the electronic pen 2 initially waits for the pressure sensor 25 to detect an applied pressure (step S10). The wait, in short, means waiting for the user to touch the side switch 30 depicted in FIG. 4B, among others. When the pressure sensor 25 detects a pressure being applied, the electronic pen 2 determines whether or not pairing is in progress with the computer 3 by the near field communication B (step S11). After determining that the pairing is underway, the electronic pen 2 detects its tilt by referencing the output of the motion sensor 26 (step S12). The electronic pen 2 also detects the amount of fingertip movement (amount of movement in direction A in FIGS. 4A and 4B) by referencing the output of the pressure sensor 25 (step S13). The electronic pen 2 then determines whether the electronic pen 2 is currently in the position input mode or in the display object control mode (step S14). If the electronic pen 2 is determined to be in the display object control mode, the electronic pen 2 transmits the data indicative of the tilt and the movement amount detected in steps S12 and S13 to the computer 3 by the near field communication B (step S15).

On the other hand, if the electronic pen 2 determines that the pairing is not in progress in step S11 or that the electronic pen 2 is in the position input mode in step S14, the electronic pen 2 terminates the process without doing any further process. That means the electronic pen 2 does not transmit the data indicative of the tilt and the movement amount to the computer 3 in the case where the pairing is not established by the near field communication B or where the electronic pen 2 communicates with the computer 3 via the pen tip electrode 23.

Figure 9:
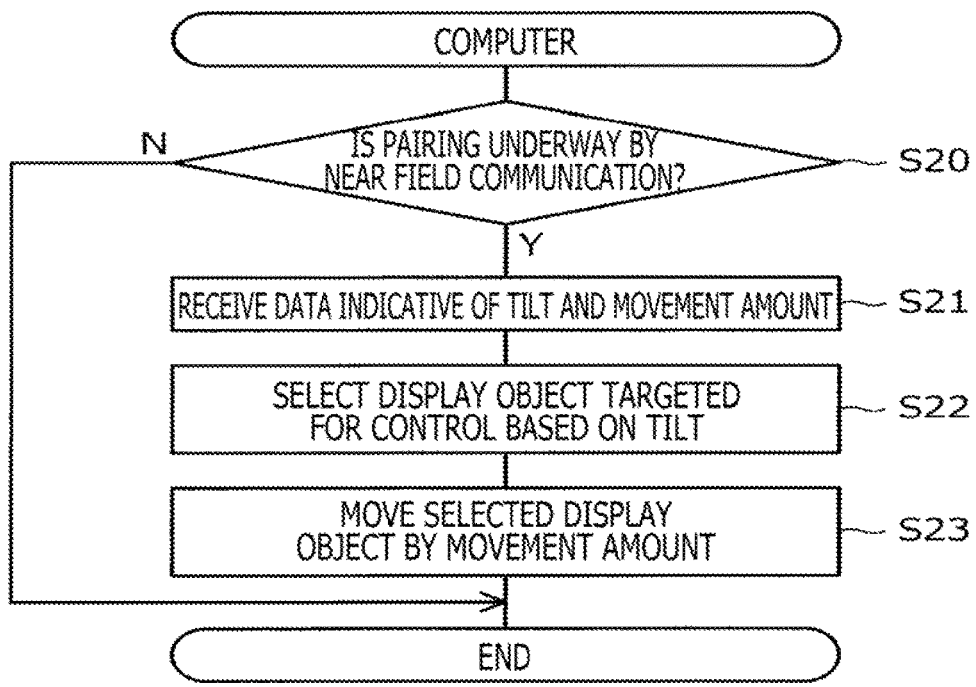
FIG. 9 is a flowchart depicting a process performed by a central processing unit (CPU) of the computer according to the first embodiment of the disclosure.

FIG. 9 is a flowchart depicting a process performed by the CPU 15 of the computer 3. This process is carried out periodically by the CPU 15. As depicted in FIG. 9, the computer 3 first determines whether or not pairing is in progress with the electronic pen 2 by the near field communication B (step S20). If the computer 3 determines here that pairing is not underway, the computer 3 terminates the process without doing subsequent processes. The reason for this is that as long as the pairing is not in progress, the data indicative of the tilt and the movement amount will not be transmitted from the electronic pen 2.

On the other hand, when determining that the pairing is in progress in step S20, the computer 3 receives the data indicative of the tilt and the movement amount from the electronic pen 2 (step S21). The computer 3 then selects the display object targeted for control (specifically, either the knob 42c or the knob 43c) (step S22).

Figure 10:
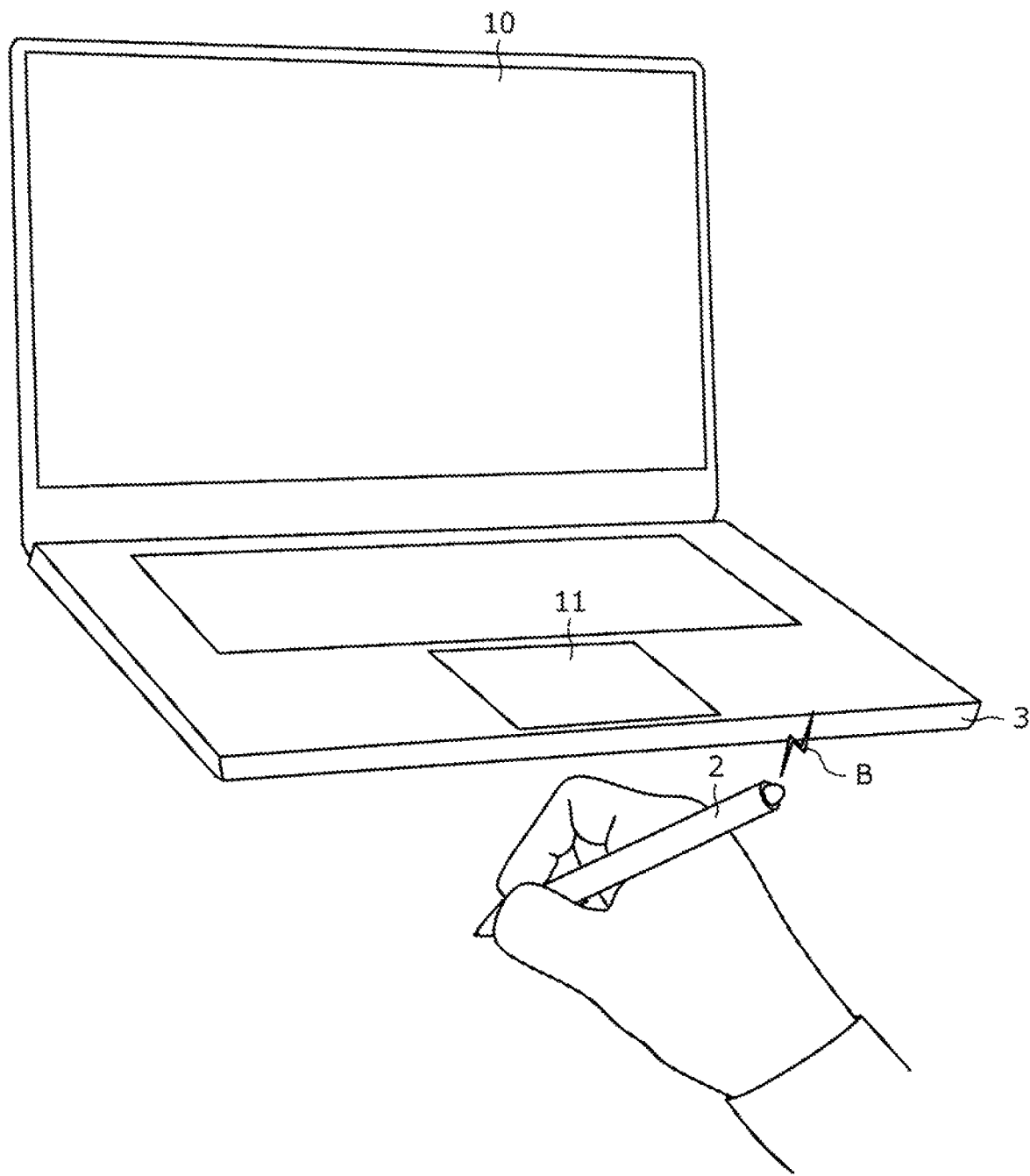
FIG. 10 is a view explanatory of a selection made in step S21 in FIG. 9.
Figure 11:
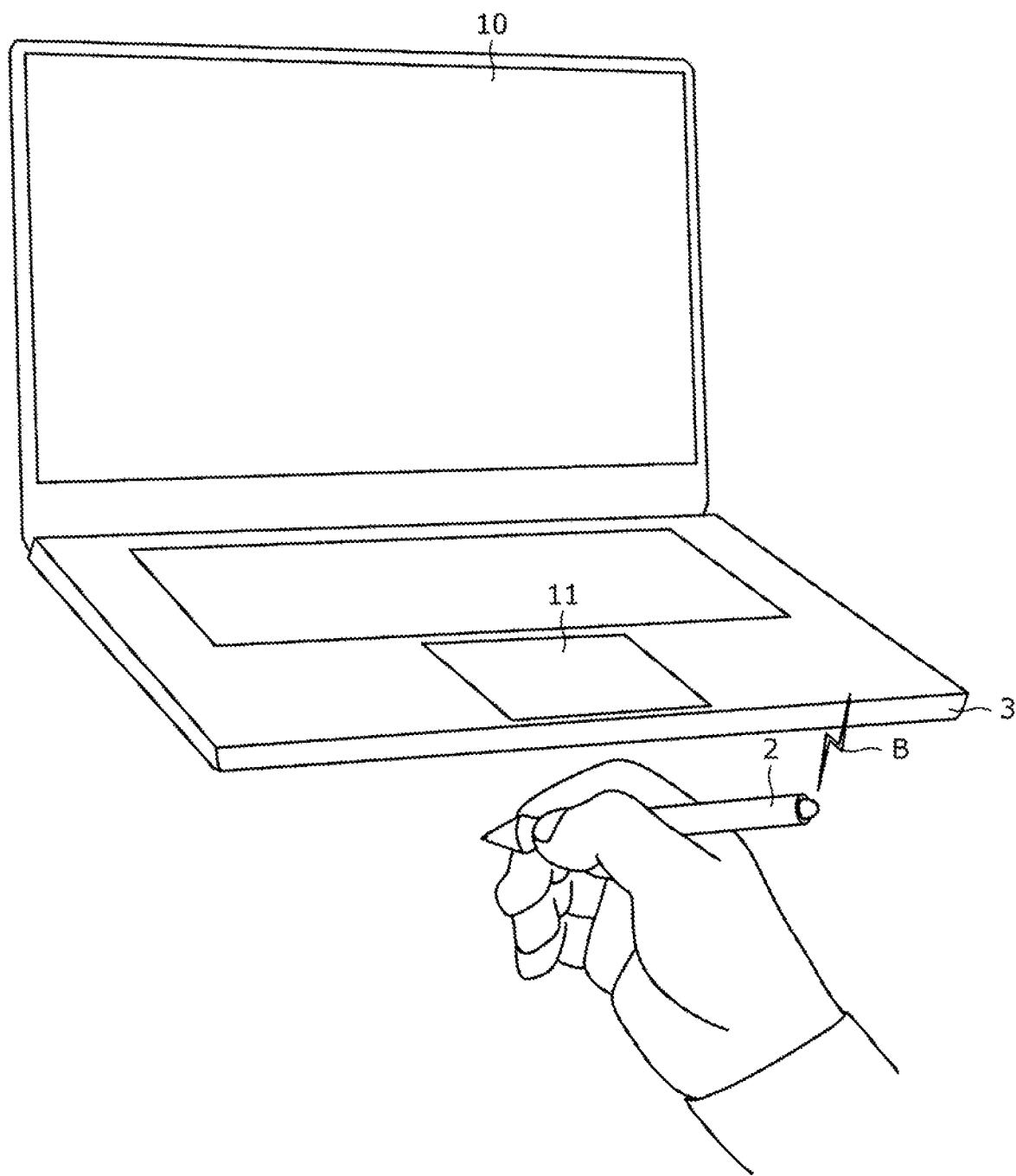
FIG. 11 is a view explanatory of another selection made in step S21 in FIG. 9.

FIGS. 10 and 11 are views explanatory of the selections made in step S21. FIG. 10 depicts a case in which the tilt of the electronic pen 2 is not horizontal, whereas FIG. 11 illustrates a case where the tilt of the electronic pen 2 is horizontal. Generally, the user viewing the window is far more likely to make the vertical scroll than the horizontal scroll. Therefore, making the horizontal scroll may preferably be limited to the case where the user holds the electronic pen 2 horizontally as depicted in FIG. 11. The vertical scroll may preferably be performed in the other cases. In view of this, upon making the selection in step S22, the computer 3 may preferably select the knob 43c for the horizontal scroll if the tilt value of the electronic pen 2 (first value) falls within a predetermined angular range relative to horizontal (e.g., 5 degrees). The computer 3 may preferably select the knob 42c for the vertical scroll if the tilt value of the electronic pen 2 (second value) is any other value (that does not fall in the predetermined angular range).

Returning to FIG. 9, after selecting the direction of scroll in step S22, the computer 3 moves the selected display object by the movement amount received (step S23). Specifically, the movement involves moving the knob 42c or 43c in the currently active (most-foreground) window (See FIG. 6). The scroll by operation of the electronic pen 2 is achieved in this manner. The computer 3 may preferably change the moving direction of the display object depending on the sign of the received movement amount (i.e., positive or negative). This allows the user to change the scroll direction by changing the direction in which to move the fingertip on the side switch 30 depicted in FIG. 2.

In the information processing system 1 according to the above-described first embodiment of the disclosure, the display object (specifically, knob 42c or 43c) appearing on the display 10 is moved by the physical quantities (the tilt of the electronic pen 2 and the amount of fingertip movement on the side switch 30) detected by the pressure sensor 25 and by the motion sensor 26. That means the movement of the display object on the display 10 is controlled easily by the electronic pen 2 without recourse to the special hardware feature such as the groove-like input section described in the above-cited Patent Document 1.

An information processing system 1 according to a second embodiment of the present disclosure is described below. The information processing system 1 of the second embodiment is configured differently from the information processing system 1 of the first embodiment in that the position input mode and the display object control mode are switched not by the presence or absence of the received uplink signal US but by the on/off state of a switch provided on the electronic pen 2. The rest of the configuration is similar to that of the information processing system 1 according to the first embodiment. The ensuing description will focus on the difference of the information processing system 1 of the second embodiment from that of the first embodiment, with the same reference characters used to designate those components in the information processing system 1 of the second embodiment that are similar to those in the information processing system 1 of the first embodiment.

Figure 12:
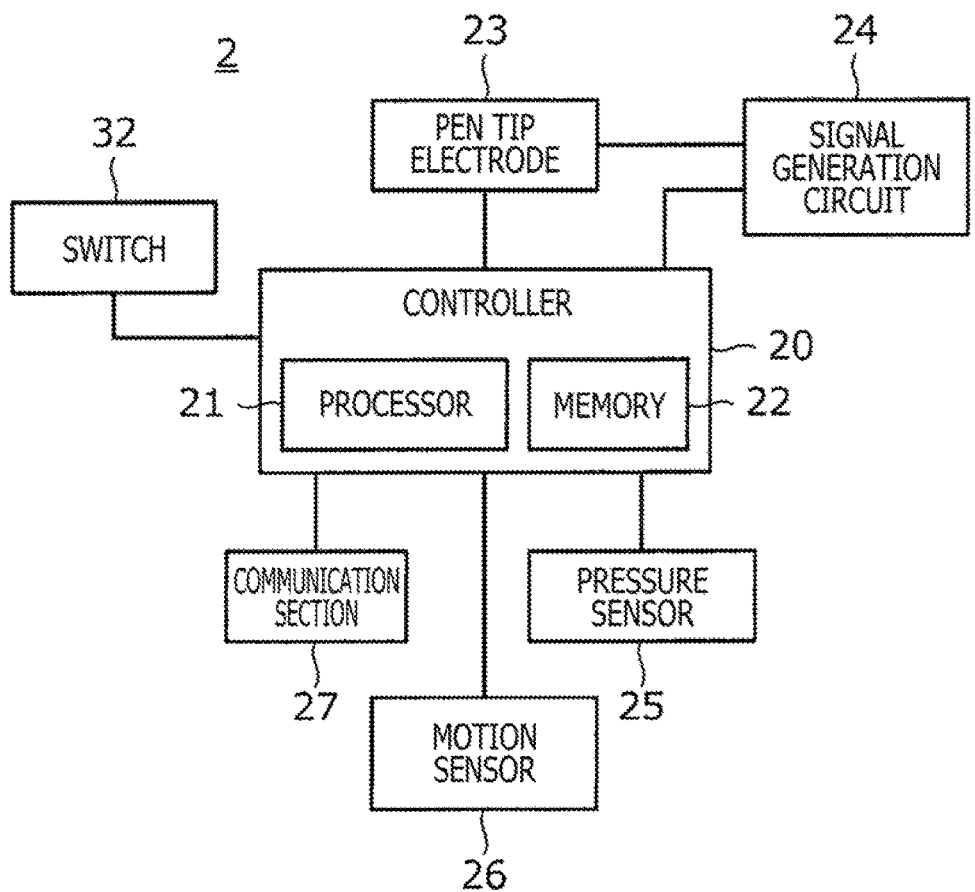
FIG. 12 is a view depicting the system configuration of an electronic pen according to a second embodiment of the present disclosure.
Figure 13:
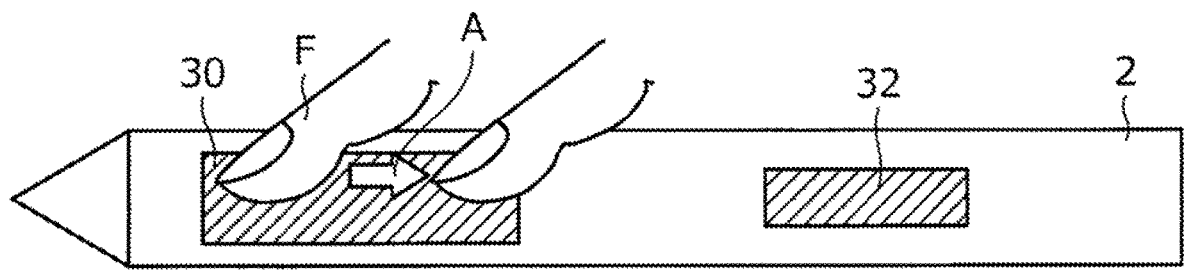
FIG. 13 is a schematic side view of the electronic pen according to the second embodiment of the disclosure.

FIG. 12 is a view depicting the system configuration of an electronic pen 2 according to the second embodiment. FIG. 13 is a schematic side view of the electronic pen 2 according to the second embodiment. As will be understood by comparing FIG. 12 with FIG. 2 and FIG. 13 with FIG. 4A, the electronic pen 2 of the second embodiment differs from the electronic pen 2 of the first embodiment in that the electronic pen 2 of the second embodiment is additionally provided with a switch 32 on the side surface of the electronic pen 2.

The switch 32 is configured to be turned on and off by the user. Specifically, the switch 32 may preferably be configured as a push-button type switch that is turned on when pressed and turned off when released. The controller 20 is configured to detect the on/off state of the switch 32 and to switch between the position input mode and the display object control mode depending on the result of the detection.

Figure 14:
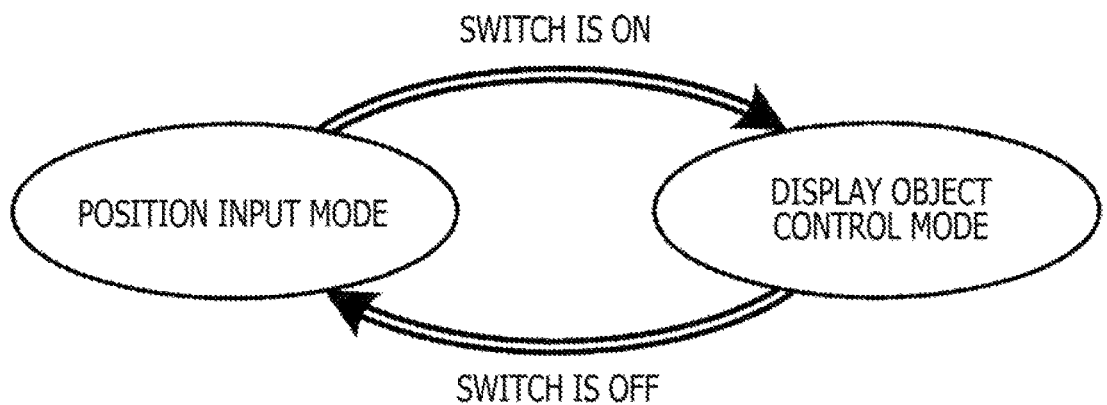
FIG. 14 is a view depicting operation mode transitions of a controller according to the second embodiment of the disclosure.

FIG. 14 is a view depicting operation mode transitions of the controller 20 according to the second embodiment. As illustrated in FIG. 14, the controller 20 of the second embodiment enters the display object control mode when the switch 32 is turned on and enters the position input mode when the switch 32 is turned off.

Figure 15:
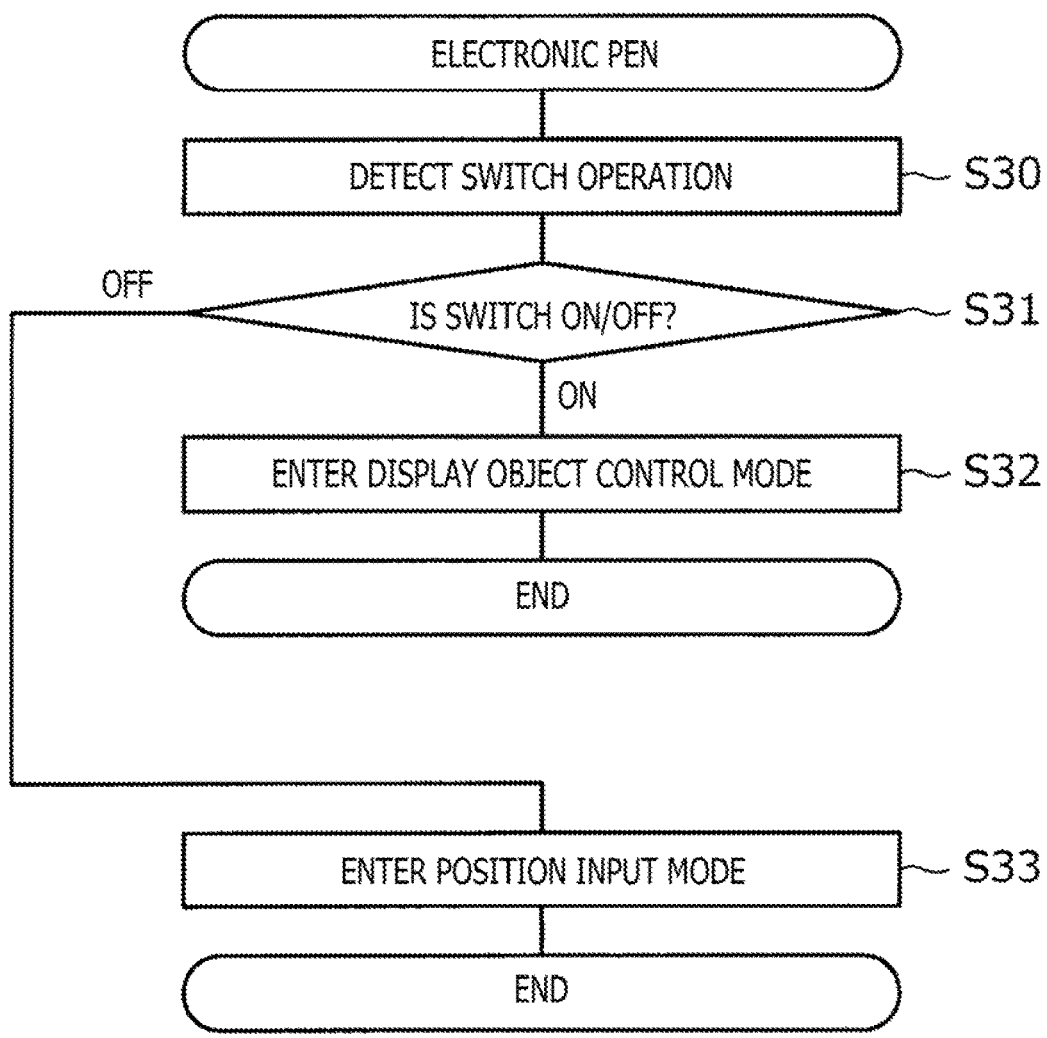
FIG. 15 is a flowchart depicting a process performed by the controller of the electronic pen according to the second embodiment of the disclosure.

FIG. 15 is a flowchart depicting a process performed by the controller 20 of the second embodiment to switch between the position input mode and the display object control mode. As depicted in FIG. 15, the electronic pen 2 first detects an operation of the switch 32 (step S30). After detecting the operation, the electronic pen 2 determines whether the switch 32 is turned on or off (step S31). If the switch 32 is determined to be turned on, the electronic pen 2 enters the display object control mode (step S32). On the other hand, if the switch 32 is determined to be turned off, the electronic pen 2 enters the position input mode (step S33). This allows the user to turn on and off the scroll operation with the electronic pen 2 depending on the on/off state of the switch 32.

As described above, the information processing system 1 according to the second embodiment enables the user to deliberately turn on and off the scroll operation with the electronic pen 2 in accordance with the on/off state of the switch 32. Thus, in a case where there is not a sufficient distance between the electronic pen 2 and the computer 3 as in an airplane seat (hence, there is a difficulty of positioning the electronic pen 2 far enough not to receive the uplink signal US), the movement of the display object on the display 10 is controlled easily by the electronic pen 2 without recourse to the special hardware feature such as the groove-like input section described in the above-cited Patent Document 1.

Described next is an information processing system 1 according to a third embodiment of the present disclosure. The information processing system 1 of the third embodiment is configured differently from the information processing system 1 of the first embodiment in that the computer 3 is configured as depicted in FIG. 5B and that the computer 3 orders the controller 20 to switch operation modes. The rest of the configuration is similar to that of the information processing system 1 according to the first embodiment. The ensuing description will focus on the difference of the information processing system 1 of the third embodiment from that of the first embodiment, with the same reference characters used to designate those components in the information processing system 1 of the third embodiment that are similar to those in the information processing system 1 of the first embodiment.

Figure 16:
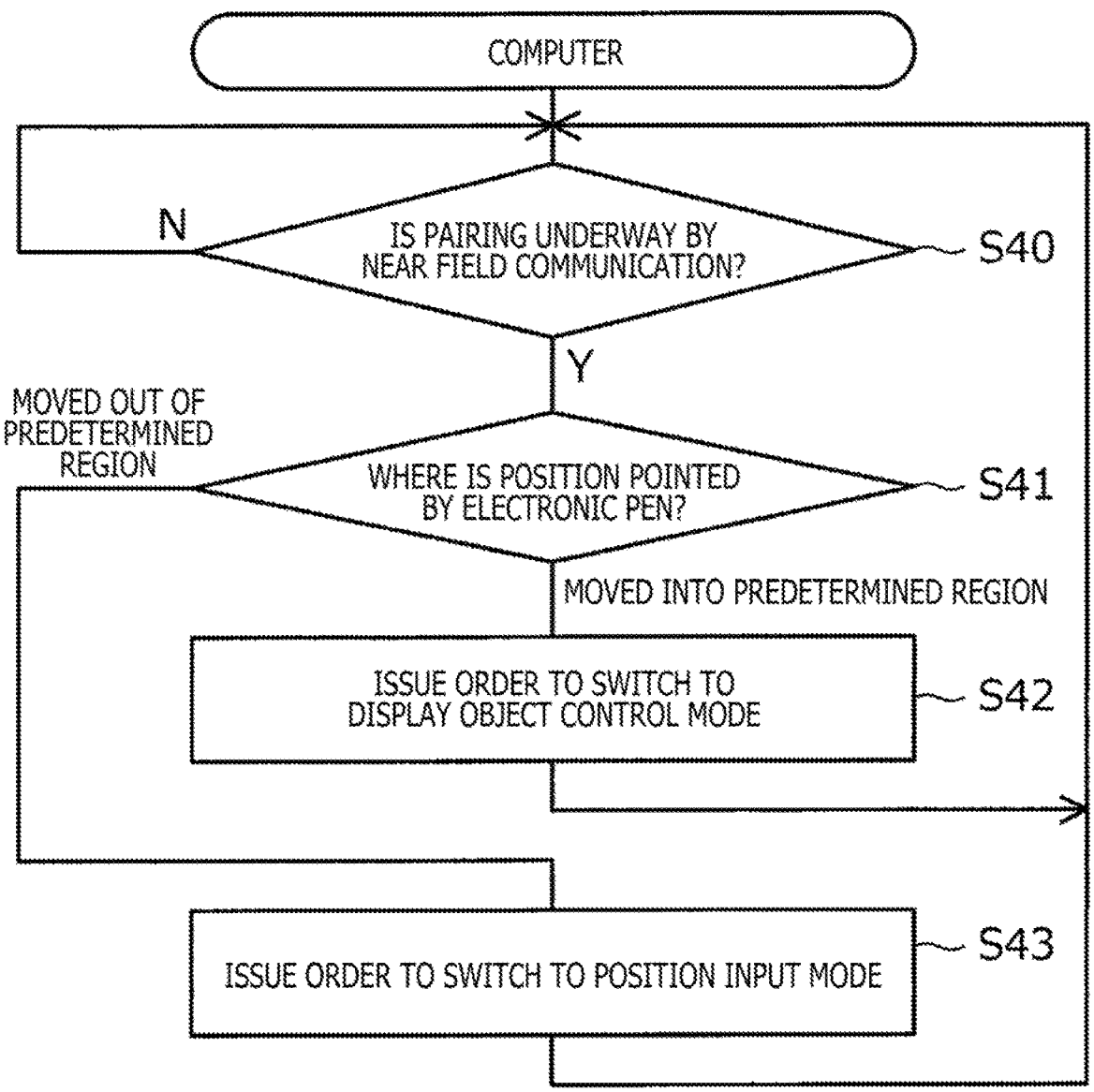
FIG. 16 is a flowchart depicting a process performed by the CPU of a computer according to a third embodiment of the present disclosure.

FIG. 16 is a flowchart depicting a process performed by the CPU 15 of the computer 3 according to the third embodiment. As depicted in FIG. 16, the computer 3 first determines whether or not pairing is in progress with the electronic pen 2 by the near field communication B (step S40). If it is determined here that the pairing is not underway, the computer 3 terminates the process without doing subsequent processes.

On the other hand, upon determining that the pairing is in progress in step S40, the computer 3 monitors the position pointed by the electronic pen 2 and detected by the sensor controller 14 for possible movement into a predetermined region (e.g., the region where the vertical scroll bar 42 or the horizontal scroll bar 43 is displayed in FIG. 6) or out of that region (step S41). In a case where the position pointed by the electronic pen 2 is moved into the predetermined region, the computer 3 transmits to the electronic pen 2 an order to switch to the display object control mode using the communication section 18 depicted in FIG. 5B (step S42). On the other hand, where the position pointed by the electronic pen 2 is moved out of the predetermined region, the computer 3 transmits to the electronic pen 2 an order to switch to the position input mode using the communication section 18 depicted in FIG. 5B (step S43). After performing the transmission in step S42 or in step S43, the computer 3 returns to step S40 and repeats the subsequent steps.

Figure 17A:
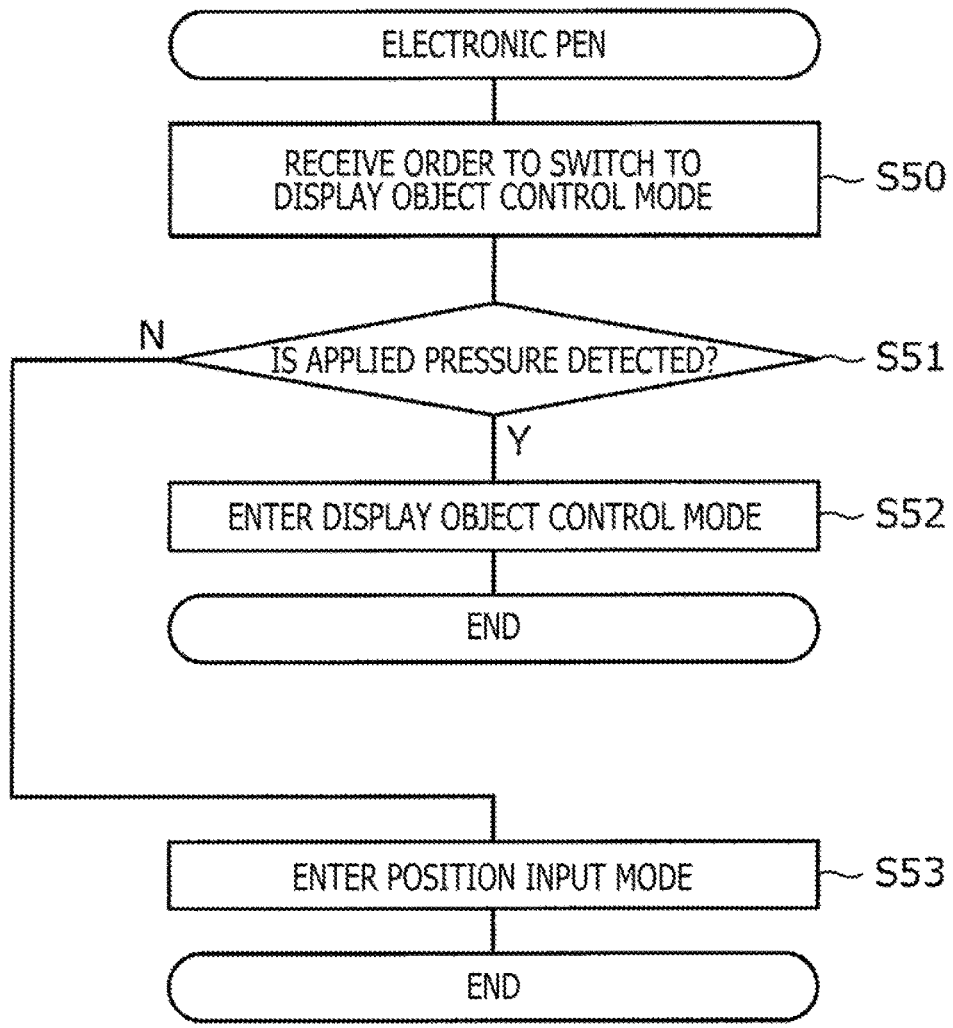
FIG. 17A is a flowchart depicting a process performed by the controller of the electronic pen according to the third embodiment of the disclosure.
Figure 17B:
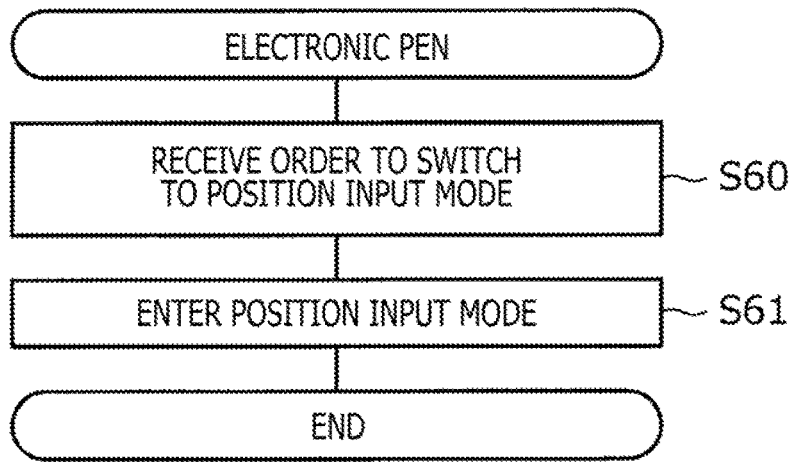
FIG. 17B is a flowchart depicting another process performed by the controller of the electronic pen according to the third embodiment of the disclosure.

FIGS. 17A and 17B are flowcharts depicting processes performed by the controller 20 of the electronic pen 2 according to the third embodiment. FIG. 17A depicts a case in which the computer 3 transmits an order to switch to the display object control mode. FIG. 17B depicts a case where the computer 3 transmits an order to switch to the position input mode.

Referring first to FIG. 17A, the electronic pen 2 receives an order to switch to the display object control mode (step S50). This causes the electronic pen 2 to determine whether or not the pressure sensor 25 detects a pressure being applied (step S51). This determination step may be carried out not once but multiple times over a predetermined time period. If it is determined in step S51 that an applied pressure is detected, the electronic pen 2 enters the display object control mode (step S52). Thereafter, as depicted in FIG. 8, every time the pressure sensor 25 detects the applied pressure, the electronic pen 2 transmits to the computer 3 the data indicative of the tilt and the movement amount of the electronic pen 2. The movement of the display object is controlled as a result. On the other hand, if it is determined in step S51 that an applied pressure has yet to be detected, the electronic pen 2 enters the position input mode (or the ongoing position input mode is continued) (step S53). In this case, the order to switch to the display object control mode, which is transmitted from the computer 3, is ignored, with position information being continuously input.

Referring next to FIG. 17B, the electronic pen 2 receives an order to switch to the position input mode (step S60). This causes the electronic pen 2 immediately to enter the position input mode (step S61). This enables the user, after moving the tip of the electronic pen 2 out of the predetermined region, to input position information immediately by use of the electronic pen 2.

As explained above, the information processing system 1 according to the third embodiment causes the electronic pen 2 to enter the display object control mode when the position pointed by the electronic pen 2 is moved into a predetermined region and to enter the position input mode when the pointed position is moved out of that predetermined region. Although the user needs to move the position pointed by the electronic pen 2 onto the vertical scroll bar 42 or onto the horizontal scroll bar 43, once the pointed position is moved in that manner, there is no need for the user to directly operate each arrow or each knob depicted in FIG. 6 when making the scroll.

The invention is not limited to the embodiments described above. Embodiments may be varied or modified diversely within the spirit and scope thereof.

For example, the cross section of the electronic pen 2 may be formed in an approximate polygon such as an approximate triangle. The controller 20 of the electronic pen 2 or the CPU 15 of the computer 3 may then determine which side of the electronic pen 2 faces up based on the result of detection by the motion sensor 26. This makes it possible to configure an information processing system 1 by which the display object displayed on the display screen is controlled in movement only when a predetermined side of the electronic pen 2 faces up.

Described also above in connection with the embodiments were cases in which the display object targeted for movement control is the knob 42c or 43c. Obviously, what is displayed by the knob 42c or 43c may be targeted instead for movement control.

The embodiments of the invention in which an exclusive property or privilege is claimed are defined as follows:

1. An information processing system comprising:
   an information processing apparatus; and
   a position indicator configured to input position information via a first transmission section to the information processing apparatus, wherein
   the position indicator includes
      a first sensor configured to detect a movement amount of a fingertip of a user,
      a second sensor configured to detect a tilt of the position indicator,
      a position indicator controller configured to enter a first mode of operation where the first transmission section communicates with the information processing apparatus and to enter a second mode of operation where the first transmission section does not communicate with the information processing apparatus, the first mode being a mode in which the position indicator inputs position information via the first transmission section to the information processing apparatus, the second mode being a mode in which the position indicator controls the information processing apparatus, and
      a second transmission section configured to transmit data indicative of the movement amount detected by the first sensor and of the tilt detected by the second sensor when the position indicator controller operates in the second mode, and
   the information processing apparatus includes
      a reception section configured to receive the data transmitted from the second transmission section of the position indicator, and
      a processor configured to control a movement of a display object displayed on a display screen on a basis of the tilt and the movement amount indicated by the data received by the reception section.

2. The information processing system according to claim 1, wherein
   the first transmission section comprises an electrode attached to a tip of the position indicator.

3. The information processing system according to claim 2, wherein
   the second transmission section transmits the data by near field communication that differs from communication via the electrode.

4. The information processing system according to claim 1, wherein
   the information processing apparatus further includes a sensor controller configured to detect, via a touch sensor, a position pointed by the position indicator, and
   the position indicator controller enters the second mode when not receiving an uplink signal transmitted from the sensor controller via a capacitive field generated by the touch sensor.

5. The information processing system according to claim 1, wherein
   the information processing apparatus further includes a sensor controller configured to detect, via a touch sensor, a position pointed by the position indicator, and
   the position indicator controller enters the first mode when receiving an uplink signal transmitted from the sensor controller via a capacitive field generated by the touch sensor.

6. The information processing system according to claim 1, wherein
   the position indictor further includes a switch that may be operated by the user, and
   the position indicator controller is further configured to enter either the first mode or the second mode depending on an operating state of the switch.

7. The information processing system according to claim 1, wherein
   when the position pointed by the position indicator is moved into a predetermined region provided in the display screen, the processor transmits to the position indicator an order to switch to the second mode, and
   the position indicator controller is further configured to, upon receipt of the order to switch to the second mode, enter the second mode.

8. The information processing system according to claim 7, wherein
   when the position pointed by the position indicator is moved out of the predetermined region, the processor transmits to the position indicator an order to switch to the first mode, and
   the position indicator controller is further configured to, upon receipt of the order to switch to the first mode, enter the first mode.

9. The information processing system according to claim 1, wherein the movement of the display object controlled by the processor involves the processor selecting the display object based on the tilt indicated by the data received by the reception section, before moving the selected display object by the movement amount indicated by the data received by the reception section.

10. The information processing system according to claim 9, wherein
the processor changes a direction of the movement of the display object in accordance with a sign of the movement amount.

11. The information processing system according to claim 1, wherein
when the tilt indicated by the data received by the reception section takes a first value, the processor moves a first scroll bar displayed on the display screen by the movement amount indicated by the data received by the reception section, and
when the tilt indicated by the data received by the reception section takes a second value, the processor moves a second scroll bar different from the first scroll bar by the movement amount indicated by the data received by the reception section.

12. The information processing system according to claim 11, wherein
the first scroll bar is a horizontal scroll bar,
the second scroll bar is a vertical scroll bar,
the first value falls in a predetermined angular range relative to horizontal, and
the second value is outside the predetermined angular range relative to the horizontal.

13. The information processing system according to claim 11, wherein
the processor executes an application program stored in a memory so as to display on the display screen a graphical user interface that includes the first scroll bar and the second scroll bar.

14. A position indicator for inputting position information to an information processing apparatus, the position indicator comprising:
a first sensor configured to detect a movement amount of a fingertip of a user;
a second sensor configured to detect a tilt of the position indicator;
a first transmission section;
a controller configured to enter a first mode of operation where the first transmission section communicates with the information processing apparatus and to enter a second mode of operation where the first transmission section does not communicate with the information processing apparatus, the first mode being a mode in which the position indicator inputs position information via the first transmission section to the information processing apparatus, the second mode being a mode in which the position indicator controls the information processing apparatus; and a second transmission section configured to transmit data indicative of the movement amount detected by the first sensor and of the tilt detected by the second sensor when the position indicator controller operates in the second mode.

15. The position indicator according to claim 14, wherein
the controller enters the second mode when not receiving an uplink signal transmitted from a sensor controller of the information processing apparatus via a capacitive field generated by a touch sensor of the information processing apparatus.

16. The position indicator according to claim 14, wherein
the controller enters the first mode when receiving an uplink signal transmitted from a sensor controller of the information processing apparatus via a capacitive field generated by a touch sensor of the information processing apparatus.

17. The position indicator according to claim 14, further comprising:
a switch that may be operated by the user, wherein
the controller is further configured to enter either the first mode or the second mode depending on an operating state of the switch.

18. A method for use with an information processing system including an information processing apparatus and a position indicator configured to input position information to the information processing apparatus, the method being devised to control a movement of a display object displayed on a display screen of the information processing apparatus, the method comprising:
causing the position indicator to detect a movement amount of a fingertip of a user;
causing the position indicator to detect a tilt of the position indicator;
causing the position indicator to enter a first mode of operation where a transmission section communicates with the information processing apparatus and to enter a second mode of operation where the transmission section does not communicate with the information processing apparatus, the first mode being a mode in which the position indicator inputs position information via the transmission section to the information processing apparatus, the second mode being a mode in which the position indicator controls the information processing apparatus;
causing the position indicator to transmit data indicative of the detected movement amount and of the detected tilt when the position indicator operates in the second mode;
causing the information processing apparatus to receive the data transmitted from the position indicator; and
causing the information processing apparatus to control the movement of the display object displayed on the display screen on a basis of the tilt and the movement amount indicated by the received data.

* * * * *